United States Patent
Reader

(10) Patent No.: US 11,717,738 B1
(45) Date of Patent: Aug. 8, 2023

(54) ROWING MACHINE HANDLE MEDIA PLAYBACK REMOTE CONTROL AND DATA COLLECTION SYSTEM

(71) Applicant: Daniel Martin Reader, Salinas, CA (US)

(72) Inventor: Daniel Martin Reader, Salinas, CA (US)

( * ) Notice: Subject to any disclaimer, the term of this patent is extended or adjusted under 35 U.S.C. 154(b) by 243 days.

(21) Appl. No.: 17/338,627

(22) Filed: Jun. 3, 2021

Related U.S. Application Data

(60) Provisional application No. 63/034,419, filed on Jun. 4, 2020.

(51) Int. Cl.
| | |
|---|---|
| *G06F 3/14* | (2006.01) |
| *G08C 17/02* | (2006.01) |
| *G06F 3/02* | (2006.01) |
| *G06F 3/0488* | (2022.01) |
| *G06F 3/0362* | (2013.01) |
| *A63B 71/06* | (2006.01) |
| *A63B 22/00* | (2006.01) |
| *A63B 21/00* | (2006.01) |

(52) U.S. Cl.
CPC ...... *A63B 71/0619* (2013.01); *A63B 21/4035* (2015.10); *A63B 22/0076* (2013.01); *G06F 3/14* (2013.01); *G08C 17/02* (2013.01); *A63B 2071/0658* (2013.01); *A63B 2071/0683* (2013.01); *A63B 2220/40* (2013.01); *A63B 2225/50* (2013.01); *G06F 3/02* (2013.01); *G06F 3/0362* (2013.01); *G06F 3/0488* (2013.01); *G08C 2201/30* (2013.01)

(58) Field of Classification Search
CPC ............ A63B 71/0619; A63B 21/4035; A63B 22/0076; A63B 2071/0658; A63B 2071/0683; A63B 2220/40; A63B 2225/50; G06F 3/14; G06F 3/02; G06F 3/0362; G06F 3/0488; G08C 17/02; G08C 2201/30
See application file for complete search history.

(56) References Cited

U.S. PATENT DOCUMENTS

| | | | |
|---|---|---|---|
| 5,910,070 A | 6/1999 | Henry | |
| 8,025,607 B2 | 9/2011 | Ranky | |
| 10,549,154 B2 | 2/2020 | Den Hollander | |
| 10,561,925 B2 | 2/2020 | Shi | |
| 2009/0085766 A1* | 4/2009 | Seydoux | B62K 11/14 340/13.24 |
| 2011/0086707 A1* | 4/2011 | Loveland | A63F 13/212 482/4 |
| 2012/0004034 A1* | 1/2012 | Pope | A63F 13/211 463/36 |
| 2013/0172153 A1 | 7/2013 | Watterson | |
| 2017/0301230 A1* | 10/2017 | Liu | G03B 17/561 |
| 2020/0353305 A1 | 11/2020 | Kuo | |

* cited by examiner

*Primary Examiner* — Omer S Khan
(74) *Attorney, Agent, or Firm* — Daniel Klemer

(57) ABSTRACT

An assembly is provided for incorporating a media playback device remote control into a rowing machine handle, without requiring modification to the handle itself. The user interface on the remote control is configured to enable a user to readily access the controls while using the machine, substantially without interfering with the user's grip on the handle. Moreover, the remote control employs wireless communication to interface with a host media playback device, which in one embodiment, can provide the user real-time data regarding the quality of handle motion.

14 Claims, 6 Drawing Sheets

ROWING MACHINE HANDLE MEDIA PLAYBACK REMOTE CONTROL AND DATA COLLECTION SYSTEM

CROSS-REFERENCE TO RELATED APPLICATIONS

This application claims the benefit of priority from U.S. provisional patent application No. 63/034,419, filed Jun. 04, 2020, entitled "Rowing Machine Handle Media Playback Remote Control and Data Collection System," which is herein incorporated by reference in its entirety.

FIELD

This invention relates to the field of exercise equipment accessories. More specifically, this invention relates to audio/visual system control accessories used in conjunction with exercise equipment, and in particular with ergometers, commonly known as rowing machines.

BACKGROUND

In many physical fitness facilities, a variety of machines are available for assisting patrons in maintaining health, performing aerobic exercises, or building muscle strength or mass. Individuals often like to work out with these machines because the machines provide a safe, controlled and efficient means of exercising specific muscles or muscle groups, and may even provide highly effective whole-body workouts.

Such machines may employ tracks, sliding carriages, levers, ropes, cables, pulleys, seats, armrests, footrests, belts, weights, springs, elastic bands, and other components to guide the user's body through a sequence of predetermined motions, during which the machine provides mechanical resistance against forces exerted by the user in a manner designed to maximize the effectiveness of the machine in exercising and developing the muscles or muscle groups for which the machine is targeted.

Fitness machines may also be designed to emulate natural forms of exercise, often with additional advantages, such as convenience, accessibility or effectiveness. For example, a treadmill mimics the action of running or jogging without the need for a track, while also providing the capability to program a controlled series of conditions in the form of speed and incline profiles. Similarly, an ergometer, or rowing machine, may be designed to mimic the process of rowing, which is known to provide an effective full-body workout by simultaneously involving both legs and upper body.

While working out in a gym, individuals often listen to music, podcasts, news or other audio programs, or watch music videos, TV shows, movies, or other video programs on a portable device such as a smartphone, MP3 device, or other media player. Such entertainment may serve to distract the individual so that they do not become fixated on the effort being expended, and are thereby able to more easily complete the exercise. If an individual is wearing headphones, the audio may drown out surrounding sounds so that the individual may more effectively focus on their performance. Moreover, listening to pleasing audio or watching an interesting video may improve an individual's mood and morale in general, and consequently, the probability that they will work through the exercise program successfully.

Many exercises are performed with a natural rhythm that depends on the specific motions being performed, the level of resistance presented by the machine to the individual performing the exercise, the individual's fitness level, and other factors. Music and other types of audio often have a specific rhythm as well, and if the rhythm of the exercise cannot readily be brought into sync with the audio by adjusting the pace, the individual may feel unsettled and unable to effectively continue with the exercise. At this point, the individual must either change the audio or video program, stop the program, or abandon the exercise.

Besides rhythmic discord, a number of other reasons exist for which an individual may wish to change the program that is playing, to increase or decrease the audio volume, or to pause, start, or stop the program altogether. For example, a song may start playing that the individual doesn't like or that they have recently grown tired of hearing, and they may wish to skip to the next song in the queue. Other people may start speaking nearby, and the individual may wish to increase the audio volume to drown out a distracting conversation. Or the individual may come to a particularly grueling phase of an exercise for which they prefer to turn off all audio and video and work out in silence to achieve better concentration and focus.

In some workout scenarios, the individual performing an exercise may have their hands free to manipulate the controls on a media player. For example, on a treadmill, the user's hands are generally available to work the controls of the treadmill itself, or to make adjustments to the playback of whatever media they may be consuming.

However, in other scenarios, an individual's hands and arms may be fully occupied with the exercise being performed, and therefore unavailable for extraneous operations. In such cases, it is crucial for the individual to maintain continuity of motion without interruption throughout the entire process.

Unique in a variety of contexts, rowing machines engage multiple major muscle groups and extremities during use. A variety of training profiles including, but not limited to sprints, endurance, and intervals, are possible. Regardless of the specific profile, each requires a constant and accurate engagement of the user's hands with the rowing machine's handle, which hinders the individual's ability to manipulate electronic devices while using the machine. For users consuming media, regularly used controls on a media playing device, such as play, pause, track advance, and volume, are nearly impossible to manipulate without interfering with the exercise. With the prior art, an individual who desires to adjust the volume of a track or podcast mid-workout, for example, may accomplish this by touching an appropriate feature on the user interface of a media playing device such as a smartphone, or by pressing a button on a smart playback device such as a wireless speaker or headset. Making such an adjustment generally requires the complete removal of one's grip on the machine's handle, which may result in the failure to maintain one's target pace.

Prior art wireless remote controls generally establish a wireless connection with a media playing device through a standard wireless transmission technology such as Bluetooth or WiFi. The remote control may translate button presses, gestures, voice commands or other control actions made by a user into digital control messages that it then communicates through the established connection to the media playing device to effect on the media playing device the functions associated with the control actions.

Moreover, remote control devices specific to exercise machine handles, and more particularly to rowing machine handles, do not exist in the prior art. Regardless of the specific technology and communications protocol employed, prior art remote control devices fail to provide a viable mechanical interface to exercise machine handles and do not position control inputs in locations adequately accessible to a user.

It would therefore be advantageous to have a remote control that may be mounted to fitness machines for which the user's hands are engaged in the activity or exercise for which the machine is intended, in a manner that provides ready access to the control's interface without substantially interfering with the user's performance of the exercise. More specific to ergometers, such a remote control would take the form of a device that is designed to securely interface with a rowing machine's handle and to offer a means for controlling a host media playback device without disrupting the user's rowing stroke.

SUMMARY

The present invention provides a novel remote control adapted to be mounted to the handle of a rowing machine. The remote control may be wirelessly connected to a media playback device for the purpose of controlling the device's media playback functions, which may include playing, pausing, or stopping playback, skipping forward to the next track in the player's queue or skipping backward to the previous track, increasing or decreasing volume, increasing or decreasing the speed of playback, selecting a playlist to play, or selecting a media source, such as the player's internal memory, an external memory card, an Internet website, an FM radio, or other sources. If the media playback device is a smartphone, the remote control may provide access to additional functions, including placing or answering phone calls.

The present invention represents an improvement upon the prior art by providing a convenient and efficient means of attaching the remote control to the rowing machine's handle in such a location and orientation that it enables the user to easily access the controls without substantially interfering with the user's performance of the exercise.

Accordingly, a key aspect of the present invention is to position elements of the control interface, which may include buttons, touch pads, switches or sliders, so as to minimize any disturbance to the user's grip on the rowing machine's handle when manipulating the control elements.

According to another aspect, the present invention mounts to the rowing machine handle using one or more of various possible attachment mechanisms, which may include a snap-fit type interface, a hook-and-loop interface, commonly known by the brand name Velcro, or mechanical fasteners, such as screws, nuts or bolts. Furthermore, housing features of the remote control may be integrated into the manufacture of the rowing machine's handle.

According to another aspect, the present invention incorporates an accelerometer into the remote control to enable power management through automatic control of its operating state. When the unit is operating in a normal active state, it consumes a certain minimum power to execute its primary functions, such as rapidly responding to button events and transmitting wireless control data to a connected host. However, when the unit is not in use, certain portions of the electronics, such as the wireless communications module, may be placed in a minimum-power idle or off state to minimize overall power consumption and maximize the amount of time that the unit will operate before the battery must be recharged or replaced. Electronics in the remote control may thus operate in a "minimal-power" mode during periods of inactivity, with only the required resources to enable interrogation of the accelerometer to know when the unit is moving. If the unit remains stationary for a certain period of time, the electronics may assume that it is not in use and place the unit into an off or low power mode. Conversely, if the unit begins moving after a period of inactivity, the electronics may power the unit on or place it in a ready active state, designated as "full-function" mode.

In yet another aspect, the present invention provides additional functions beyond the essential remote control, which may include reading sensors incorporated into the remote control, collecting and processing sensor data, and providing feedback to the user regarding the quality and effectiveness of the user's performance. In one such embodiment, the remote control contains an accelerometer that measures instantaneous vector acceleration, and a processor that processes the acceleration measurements to determine parameters of motion, which may include unit position, velocity, and smoothness of the user's hand motion. The resulting information may then be wirelessly communicated back to the host device to be presented to the user via an application that runs on the device, such as a smartphone application, to provide real-time feedback to the user about the quality of motion of the handle.

In another embodiment, the remote control provides both the power control and real-time user feedback functions, and the remote control electronics may be configured such that a single accelerometer supplies acceleration measurements to both.

DETAILED DESCRIPTION

Figure 1:
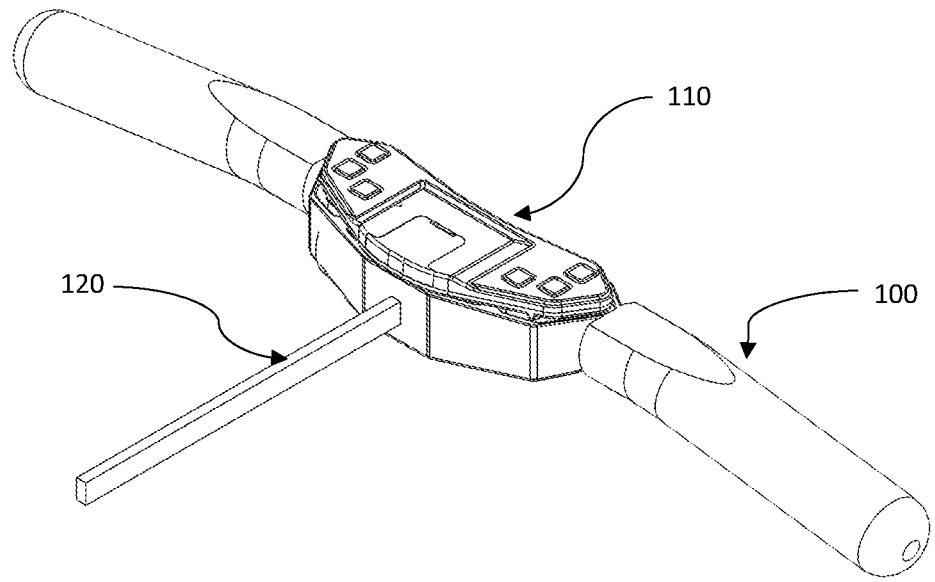
FIG. 1 is a front isometric view of a remote control according to one embodiment of the present invention, mounted to the handle of a commercial rowing machine.

Within the context of the present invention, the following definitions apply:

"processor" may refer to a single-board computer, computing module, embedded controller, microcontroller, microprocessor, or other computing means capable of performing a sequence of tasks according to a programmed set of instructions;

"program", "programmed set of instructions", and "firmware" may refer to a stored sequence of instructions that a processor may perform to carry out a set of tasks; the sequence of instructions may be stored in a non-transitory medium readable by the processor, such as a flash memory, read-only memory (ROM), or hard disk drive;

"host", "host system", "host device", "media playback device", "media processing device" and "media player" may be used synonymously to refer to a device or system, such as a laptop computer, desktop computer, smartphone, tablet computer, control console on a fitness machine, an MP3 player or other electronic device capable of playing audio or video media;

"media processing device control message" may refer to a package of digital data interpretable by a media processing device, including at least one instruction directing the media processing device to perform a task, together with any control parameters necessary to enable completion of the task;

a "wireless connection" of two devices may refer to a cooperative relationship established between the devices for the purpose of exchanging digital data using a standard wireless data transmission technology, including radio-frequency (RF) and optical technologies such as Bluetooth, Wi-Fi, and Infrared Data Association (IrDA);

"wireless communications module" is an electronic circuit capable of establishing a wireless connection with another device and wirelessly transmitting digital data to the device and wirelessly receiving digital data from the device;

a "fitness machine handle" may refer to a handle on a fitness machine that is gripped by a user of the fitness machine in the course of using the fitness machine for its primary intended function;

"user interface element" refers to a device or feature which accepts input from a user for the purpose of controlling the operation of a unit; a user interface element may be physical in form, such as a switch, button, touch-sensitive switch, electronic slider, electronic rotary control, or potentiometer; or it may take the form of a graphical user interface control, such as a button, slider, or rotary knob dynamically presented to a user through a graphical user interface (GUI) on a touchscreen display;

a "user interface" refers to a collection of user interface elements;

"snap fit" refers to a method of securing interlocking parts together, wherein interference between the interlocking features on the separate parts would normally prevent them from being pushed together, except that at least one of the parts is designed to be compliant or flexible, so that when a suitable force is applied to the parts, the interference causes the parts to deform by an amount sufficient to allow the features to slide past one another until they reach a position in which the interlocking parts are securely engaged;

"motion data model", "standard motion model", and "standard stroke model" may be used synonymously to refer to a description of an archetypal spatiotemporal motion sequence, against which a measured motion sequence may be compared to determine the quality of the measured motion sequence, as determined by its conformity to the standard motion model;

"application" and "app" may synonymously refer to an executable program resident on a host device;

"remote control", "remote control and data collection system", and "unit" may be used synonymously to refer to an embodiment of the present invention;

"user", "rower", and "individual", may be used synonymously to refer to a person using a fitness machine for its primary intended function.

The present invention in its preferred and alternative embodiments will be described herein, in conjunction with the drawings, primarily in the context of rowing machines. However, it will be apparent to those skilled in the art that the same media remote control and data collection system may be employed equally effectively, without deviating from the scope of the present invention, on many other fitness machines having a handle or other feature that engages the user's hands during an exercise.

The preferred embodiment of the present invention is illustrated in FIG. 1, which shows the remote control 110 mounted to handle 100 of a commercial rowing machine. The handle 100 is connected to the rowing machine by chain 120.

Figure 2:
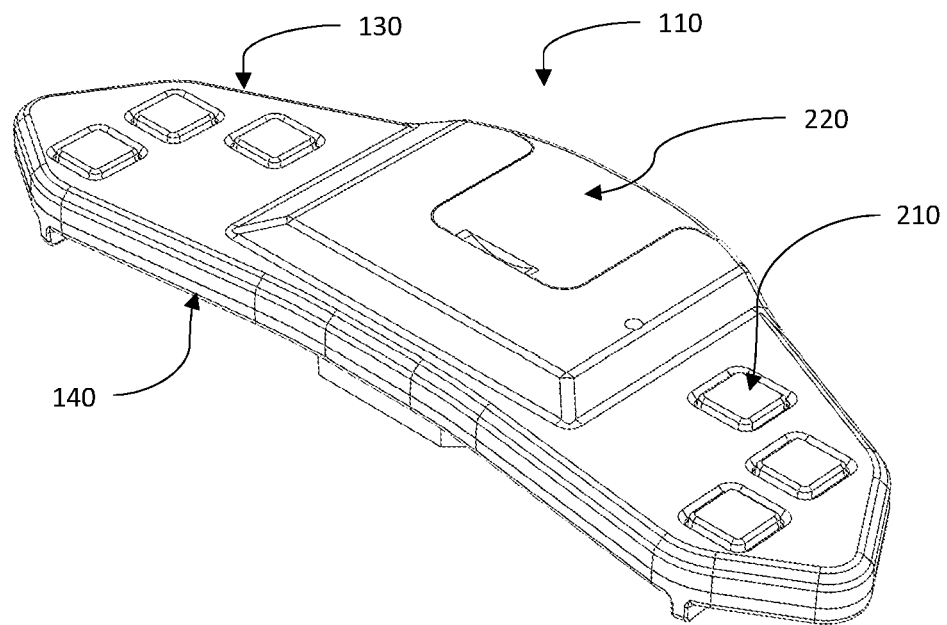
FIG. 2 is an isometric view of a remote control according to one embodiment of the present invention, in its unmounted state.

FIG. 2 shows a closer view of the unmounted remote control unit 110. In the preferred embodiment, the remote control comprises a top housing 130, which encloses the unit's electronics and retains buttons 210, and a bottom housing 140, which provides a base for mounting the unit to the handle 100. Each of the buttons 210 is associated, individually or in combination with at least one other button, with at least one control function, such that the user may effect a desired control function by pressing the appropriate button or combination of buttons. The unit may be powered by a battery, and the battery may be replaced by first removing battery cover 220.

Figure 3:
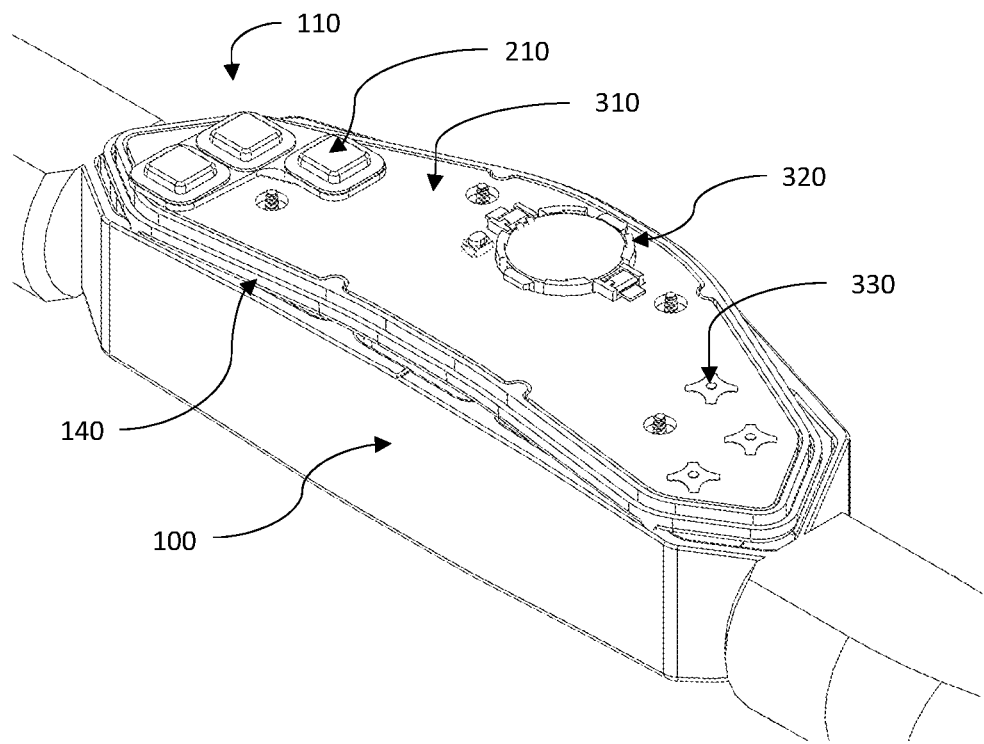
FIG. 3 is an isometric view of a remote control according to one embodiment of the present invention, as installed on a rowing machine handle, with its upper housing element and a portion of the button actuators removed.

The remote control 110 is shown in FIG. 3 with its top housing removed to reveal the main printed circuit board 310, which comprises battery socket 320 and buttons 210. Three of the buttons have been removed on the right side of the unit in FIG. 3, such that button actuators 330 may be seen for the purpose of illustration.

In the preferred embodiment of the present invention, printed circuit board 310 further comprises a communications module adapted to wirelessly connect with a host device using a standard wireless communications protocol, such as Bluetooth or WiFi, for the purpose of sending data to and receiving data from the host and for controlling media playback on the host device. The printed circuit board 310 further comprises a processor adapted to accept input from a user interface and to perform appropriate actions in response to the input, including formulating control messages to send to the host device and transmitting the control messages to the host through the communications module. While the primary user interface illustrated in FIG. 3 comprises mechanical buttons, other user interface elements may be employed as well, including a touch screen display that presents virtual buttons and other controls through a graphical user interface.

Figure 4:
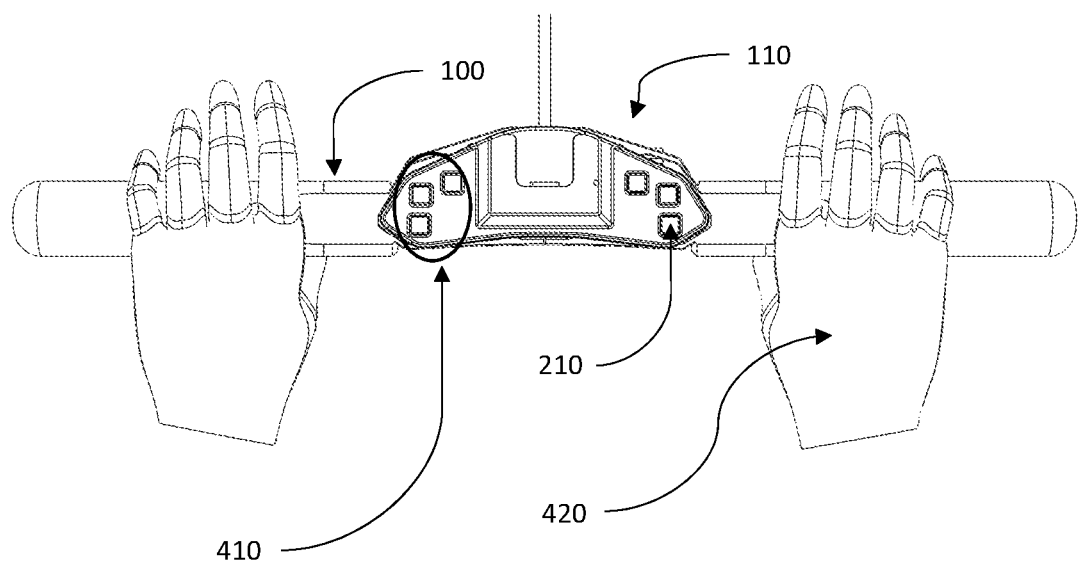
FIG. 4 is a plan view of a remote control according to another embodiment of the invention, showing relative locations of the remote control, interface features, and the user's hands.

As illustrated in FIG. 4, a key feature of the present invention is the layout 410 of the user interface and the placement of the corresponding buttons 210 and other user interface elements relative to the user's hands 420, such that the user may comfortably and conveniently operate the remote control 110 without removing their hands 420 from the handle 100, and furthermore, without substantially interfering with their performance of the exercise in which they are engaged. It is in general desirable to place the buttons 210 and other user interface elements outward from the centerline of the rowing machine handle, and in such locations that they fall within the natural reach of at least one of the user's thumbs and fingers with the user's hands 420 in the nominal expected positions for the exercise.

Figure 5:
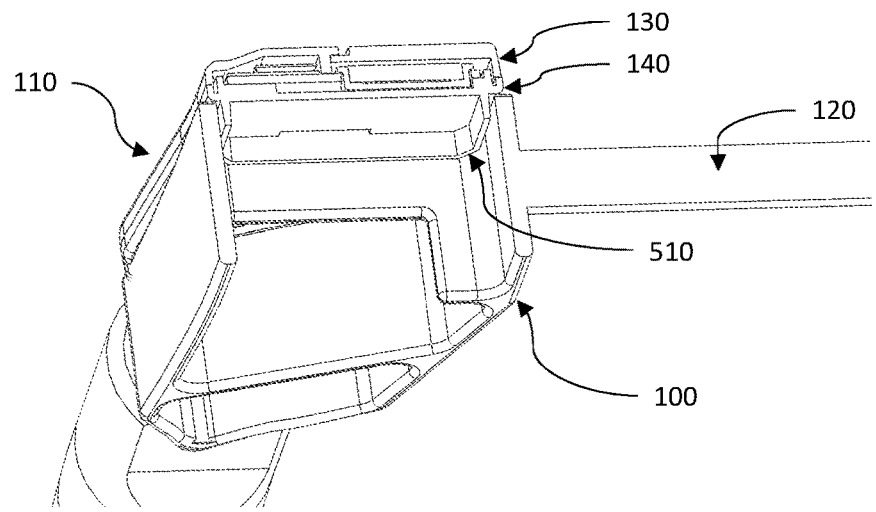
FIG. 5 is a section view of a remote control according to one embodiment of the invention as mounted to the rowing machine handle, showing locating features on the remote control housing.

FIG. 5 illustrates locating features 510 on the bottom housing 140 of the remote control 110, in a bottom section view of the unit as mounted on the handle 100. The locating features 510 comprise a locating boss sized to fit into and interlock with the structure of the rowing machine's handle 100, such that the remote control 110 is repeatably and predictably located with respect to the handle 100 when the unit is mounted.

Figure 6:
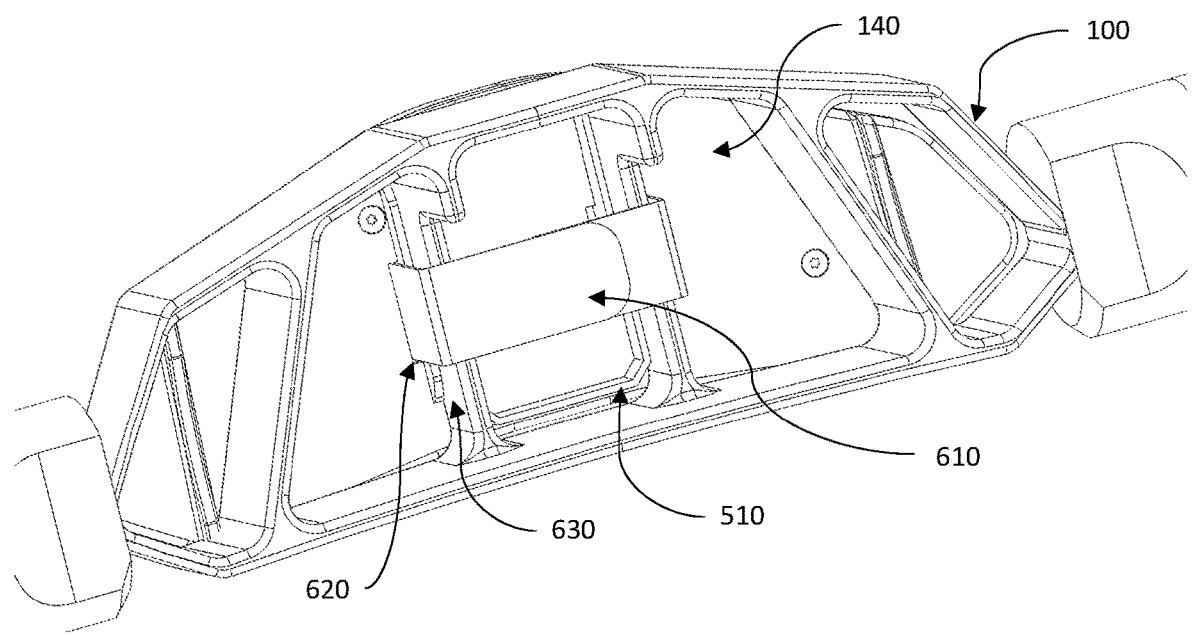
FIG. 6 is an angled, bottom view of a remote control according to one embodiment of the invention using a hook-and-loop strap to secure the remote control to the rowing machine handle.

As shown in FIG. 6, the remote control 110 is secured to the handle 100 of the rowing machine using a hook-and-loop strap 610, which passes through access slots 620, which together form a channel for the hook-and-loop strap 610 in the lower housing 140, and around longitudinal structural elements 630 of the handle 100. Fastening the ends of the hook-and-loop strap 610 together thus secures the remote control 110 to the handle 100. As an alternative arrangement, the remote control 110 may be secured to the handle with a plurality of hook-and-loop straps 610 affixed to the housing, wrapped around the longitudinal structural elements 630 and fastened to one another by the hook-and-loop features.

Figure 7:
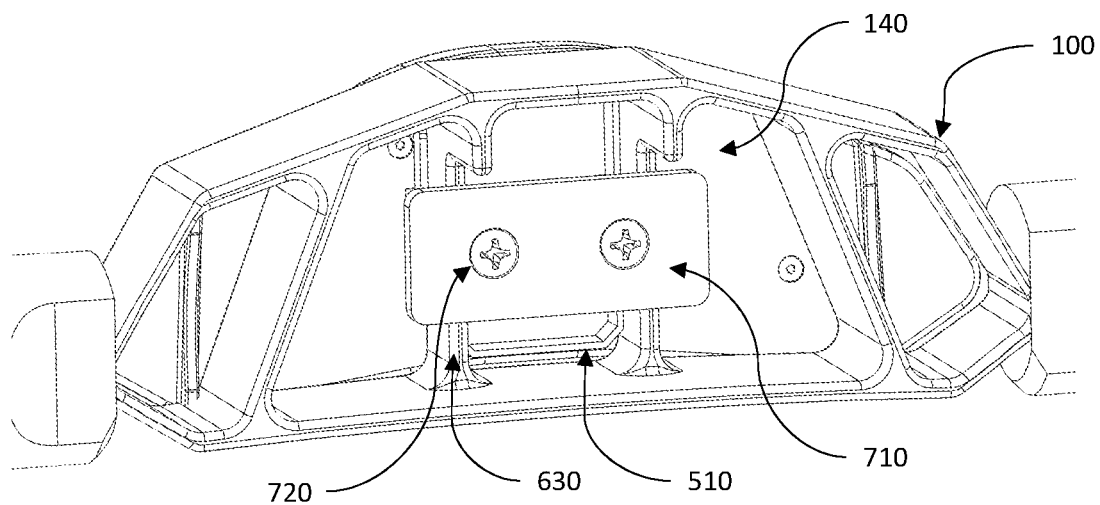
FIG. 7 is an angled, bottom view of a remote control according to one embodiment of the invention using a plate and fasteners to secure the remote control to the rowing machine handle.

In another embodiment of the present invention, the remote control 110 is secured to the handle 100 as illustrated in FIG. 7, with interface plate 710 and mechanical fasteners 720. The interface plate, in conjunction with the bottom housing 140 and fasteners 720, form a clamping mechanism that grips the structural elements 630 to secure the remote control 110 to the handle 100 when the fasteners 720 are suitably engaged with mating features in the bottom housing 140. The interface plate 710 in so functioning, may be considered a "bracket", and therefore represents a broader class of brackets that may be similarly employed to secure the bottom housing 140 to the handle 100. Moreover, the fastening mechanism shown comprises a threaded bolt that engages a thread or nut in the bottom housing 140. However, alternative fastening mechanisms that may be employed to secure the remote control 110 to the handle 100 include a screw that forms threads in a plastic boss formed into the bottom housing 140; a retaining ring that engages a shaft or pin in the bottom housing 140; or a rivet that engages a receptacle in the bottom housing 140.

Figure 8A:
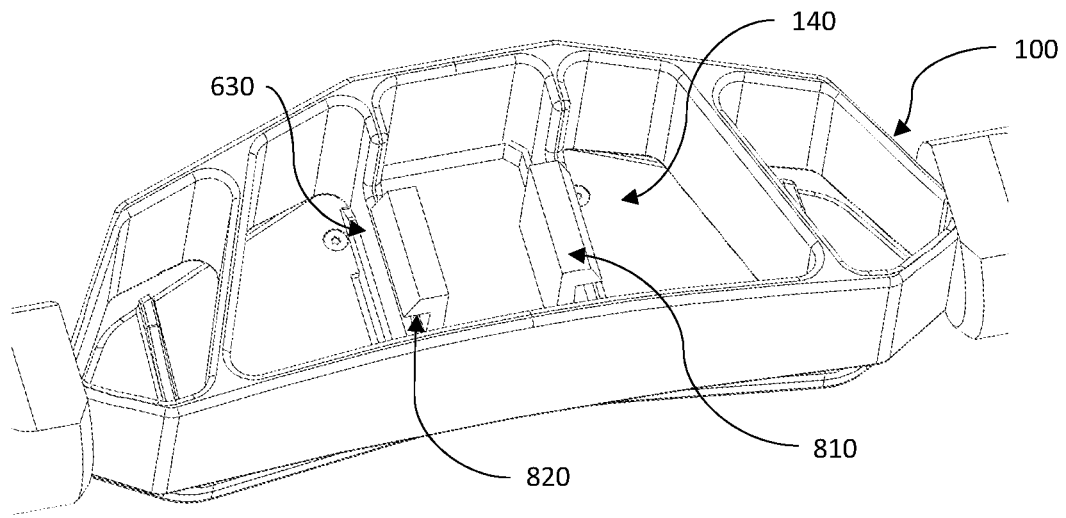
FIG. 8*a* is an angled, bottom view of a remote control according to one embodiment of the invention using compliant locking arms to secure the remote control to the rowing machine handle.
Figure 8B:
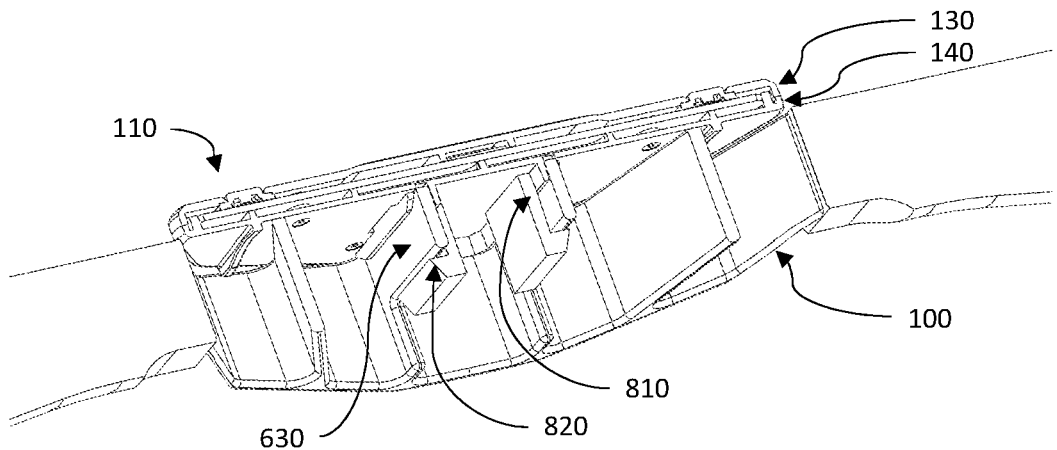
FIG. 8*b* is a sectioned view of a remote control according to one embodiment of the invention and the rowing machine handle to which it is mounted using compliant locking arms to secure the remote control to the rowing machine handle.

FIGS. 8a and 8b illustrate another embodiment of the present invention, in which the remote control 110 is secured to the handle 100 using a plurality of compliant snap-fit members 810 connected to the bottom housing 140, the snap-fit members 810 having locking features 820 that mesh with the structural elements 630 of the rowing machine handle 100. When a normal force is applied to the bottom housing, the engagement of the locking features 820 with the structural elements 630 of the rowing handle induces a lateral force on the locking features 820 causing the structural members 810 to deform by an amount sufficient to allow passage of the locking features 820 through the space between the structural elements 630. When the locking features 820 have cleared the structural elements 630, the lateral force disappears, and the snap-fit members 810 snap back to their original shape, causing the locking features 820 to capture the bottom housing 140 in its installed position. To remove the unit 110 from the handle 100, an external force must be applied to the locking features 820 to deform the snap-fit members 810 by an amount sufficient to enable passage of the locking features 820 back through the space between the structural elements 630.

Figure 9A:
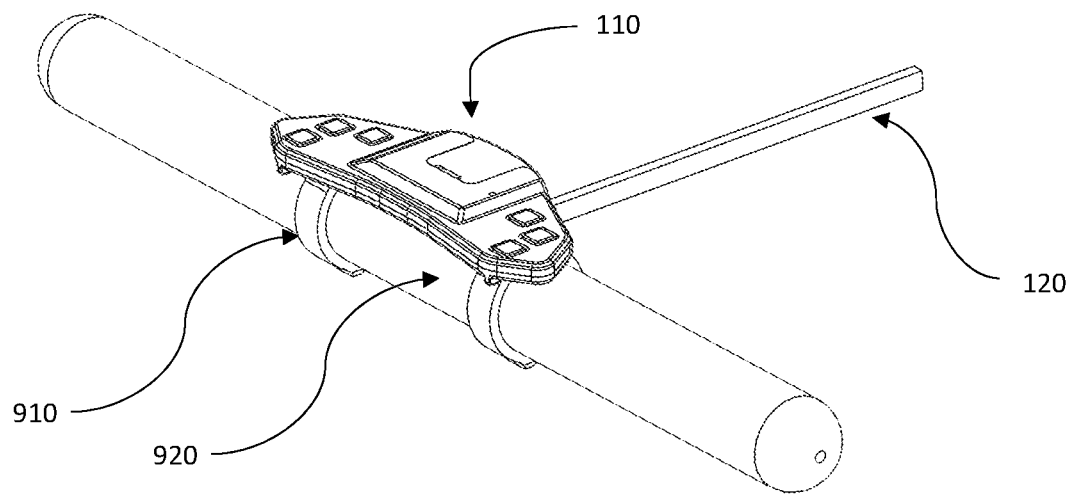
FIG. 9*a* in an isometric view of a remote control according to another embodiment of the invention adapted to be installed on handles of constant cross section.
Figure 9B:
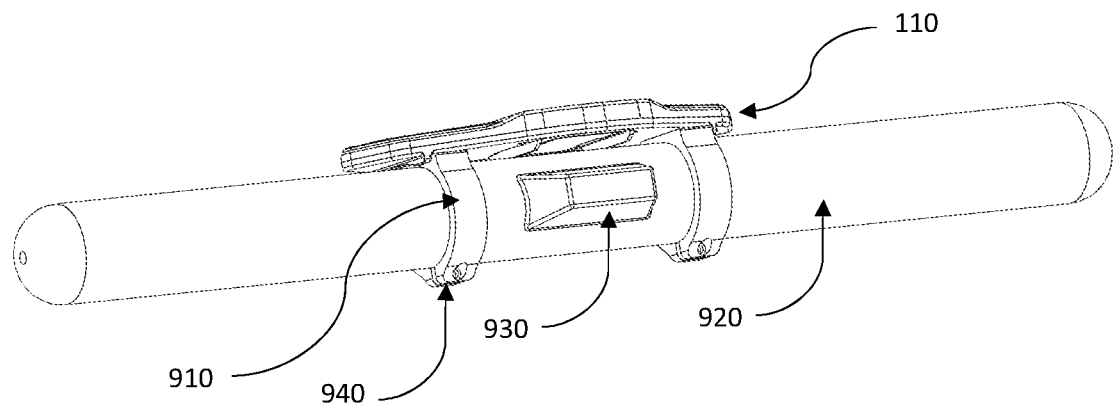
FIG. 9b is a front-angled view of a remote control according to another embodiment of the invention adapted to be installed on handles of constant cross section.

FIG. 9a and FIG. 9b show an alternative embodiment of the present invention adapted to mount remote control 110 to handle 920 having a substantially constant sectional profile. The handles on many fitness machines comprise a simple cylindrical bar having a substantially constant circular cross-section, as exemplified by handle 920. For handles of this type, adapters 910 affixed to the lower housing 140 secure the remote control 110 to the handle 920 using ring clamping mechanism 940. In FIG. 9b, attachment feature 930 secures the chain 120 to the handle 920.

Other basic bar handle designs are possible with alternate sectional profiles, including D-shaped, square or rectangular. The same type of ring clamping mechanism shown in FIGS. 9a and 9b may be employed for these handle designs as well, provided that the shape of the ring clamp opening substantially matches the sectional profile of the handle.

Figure 10:
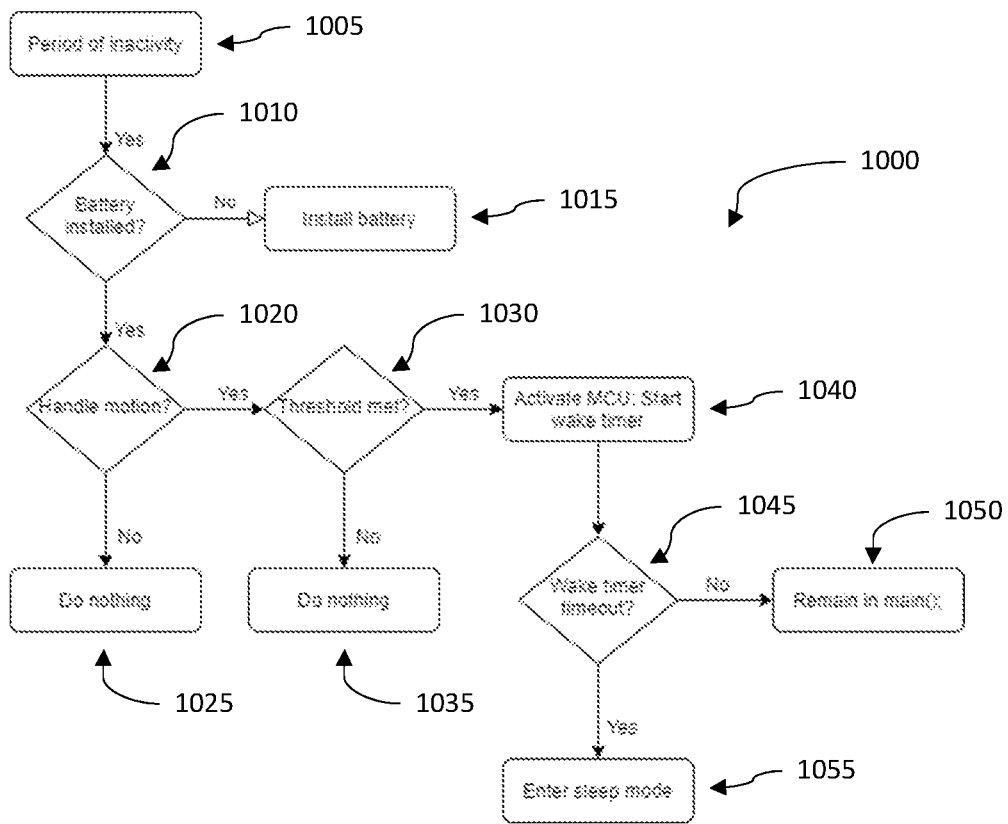
FIG. 10 is an event-driven flow chart describing the process of employing an accelerometer for power management control according to yet another embodiment of the invention.

In another embodiment of the present invention, circuit board 310 further comprises at least one accelerometer which measures acceleration along at least one axis. The circuit is configured to remain in an active state only when the unit is in motion, and to enter a low power consumption state after a period of inactivity, according to event-driven flow chart 1000 in FIG. 10. For this flow chart, the decision blocks may be independently evaluated periodically, or in response to an event trigger. During a period of inactivity in which the unit remains motionless, the electronics are placed in "minimum-power" mode 1005, in which non-essential portions of the electronic circuit are powered off or placed in a minimally-powered state. In this mode, the unit will have available only enough functionality to determine whether to remain in the minimum-power mode or to transition into an active state. If the unit has no battery installed, or if the battery has insufficient energy to power the system, according to step 1010, the system cannot power on, and the process terminates in state 1015. If there is sufficient battery power, the process advances to step 1020, where the accelerometer is interrogated to determine if the unit is in motion; if not, the process proceeds through non-terminal state 1025 where no action is taken. If motion is detected in state 1020, the process moves to step 1030, where the motion is compared to a minimal threshold to determine whether the unit is "in motion", for which the detected motion qualifies as an indication that the unit is in use. Step 1030 is necessary to prevent the unit from intermittently powering on due to electrical noise in the accelerometer or electronics, or due to motions from vibrations or other small disturbances in the surrounding environment. If the detected motion does not meet the threshold criterion in step 1030, the process once again takes no action in non-terminal state 1035. If the detected motion is sufficient, the process advances to state 1040, in which the processor is placed in an active state, and a wake timer is started to enable the unit to operate for a minimal period of time in operating state 1050, during which the unit operates in "full-function" mode, in which the processor performs all primary functions of the remote control. As long as motion is detected in step 1020 and it is of sufficient magnitude to meet the threshold criterion in step 1030, the unit will remain active, and the wake timer will continue to be reset. However, if insufficient motion is detected, the wake timer will eventually expire in step 1045, and the process will proceed to state 1055, wherein the unit enters a minimum-power, or sleep mode, and the process restarts from state 1005.

Figure 11:
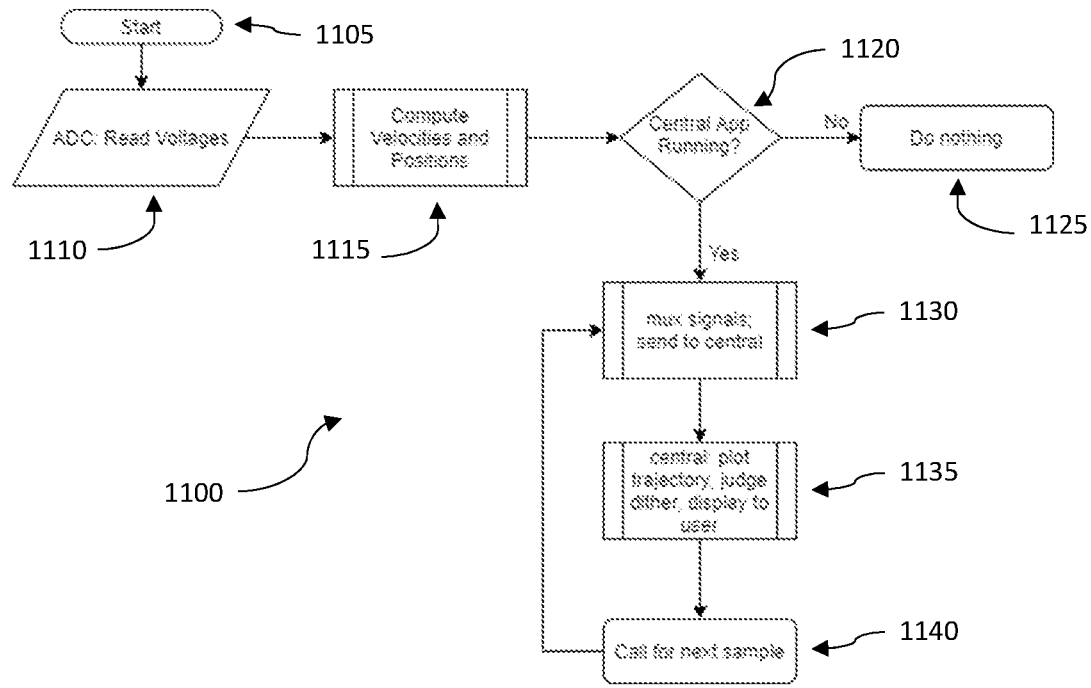
FIG. 11 is an event-driven flow chart describing the process of employing an accelerometer to provide real-time feedback on handle position and motion during the performance of an exercise according to yet another embodiment of the invention.

According to yet another embodiment of the present invention, circuit board 310 further comprises at least one accelerometer which measures acceleration along at least one axis. The circuit is configured to acquire acceleration measurements from the accelerometer, calculate parameters of motion of the handle from the measurements, and provide feedback to the user regarding the parameters of motion according to the event-driven flow chart shown in FIG. 11. The process of interrogating the accelerometer is periodically initiated from Start state 1105. The processor obtains a measurement of acceleration using an analog-to-digital converter (ADC) in step 1110 to read a voltage in the circuit proportional to acceleration for each axis in which acceleration is measured. Alternatively, an accelerometer may be employed having a digital interface through which the processor may directly acquire a measurement of acceleration for each axis along which the accelerometer is configured to measure. The processor applies algorithms well-known in the art to the acceleration measurements in step 1115 to determine displacement, velocity, and acceleration characteristics of the handle during use. In step 1120, the processor determines whether a central application is active on a connected host device, such as a smartphone, tablet or computer. If no central application is found to be connected and active, the process proceeds to non-terminal state 1125, and no additional action is taken. If, however, an application is connected and active, the processor proceeds to step 1130, in which the signals describing characteristics of the motion are combined into a multiplexed data stream that is communicated to the central application through the active wireless connection. The data is received on the host device by the central application in step 1135, whereupon the central application provides the rower with a real-time visualization of the handle's trajectory at all times during the stroke. For training purposes, the central application may further compare the measured motion to a standard stroke model to assess quality of the rower's performance. Deficiencies may be indicated to the user, such as "hand-speed out of bow," "rushing the slide," "catch engagement," excessive hand motion due to poor posture on the recovery, and handle disturbances leading to chain/belt contact with the rowing machine's structure. Such feedback may enable a rower to reduce their tendency to develop poor technique habits when training during the winter season, during which waterborne practice is unavailable.

In another embodiment of the present invention, the housing of the remote control may take the form of a handle for a fitness machine, with appropriate mechanical interface features to enable the remote control to be substituted in place of the fitness machine's original handle.

In an additional embodiment, a remote control device incorporating at least one accelerometer may be adapted to be mounted to the seat of the rowing machine and configured to wirelessly communicate additional information about the rowing motion of the seat to the central application, enabling additional analysis and assessment regarding the quality and effectiveness of the rower's performance.

What is claimed is:

1. A wireless remote control comprising:
   a housing adapted to be removably and selectively attached to a fitness machine handle on a fitness machine, the housing comprising securing means to secure the housing to the fitness machine handle;
   at least one user interface element disposed on the housing;
   a wireless communications module adapted to wirelessly exchange digital data with a media processing device;
   a processor electronically connected with the at least one user interface element and the wireless communications module, the processor being adapted to:
      receive input from the at least one user interface element, and in response to the input received from the at least one user interface element,
      transmit at least one media processing device control message to the media processing device by means of the wireless communications module,
   wherein the at least one user interface element is positioned on the housing so as to enable a user gripping the fitness machine handle to manipulate the at least one user interface element without substantially impairing the user's grip on the handle;
   power control electronics for controlling the operating state of the remote control, the power control electronics being electronically connected with the processor, and the operating state having at least a minimum-power mode and a full-function mode;
   an accelerometer for detecting motion, the accelerometer being electronically connected with the processor;
   wherein the processor is further adapted to
      receive motion detection data from the accelerometer; and
      set the operating state of the remote control based on the motion detection data by means of the power control electronics,
   wherein the processor sets the operating state in the full-function mode when the motion detected by the accelerometer is at or above a minimum threshold for operation, and the processor sets the operating state in the minimum-power mode when the motion detected by the accelerometer remains below the minimum threshold for operation for a predetermined period of time; and
   at least one accelerometer for measuring acceleration in at least one direction, the at least one accelerometer being electronically connected with the processor, wherein the processor is further adapted to:
   receive acceleration measurements from the at least one accelerometer;
   calculate data representing characteristics of motion based on the acceleration measurements; and
   transmit the data representing characteristics of motion to the media processing device by means of the wireless communications module.

2. The wireless remote control of claim 1, wherein the wireless communications module is one of a Bluetooth transceiver, a WiFi transceiver, and an infrared optical transmitter.

3. The wireless remote control of claim 1, wherein the at least one user interface element is one of a physical button, a physical switch, a touch-sensitive switch, a potentiometer, an electronic rotary control, an electronic slider, and a graphical user interface control on a touchscreen display.

4. The wireless remote control of claim 1, wherein the securing means of the housing comprises:
   at least one channel for receiving a hook-and-loop strap; and
   a hook-and-loop strap, the hook-and-loop strap having first and second ends and first and second sides, the first end having a plurality of hooks on the first side and the second end having a plurality of loops on the second side,
   wherein the hook-and-loop strap passes through the at least one channel and around a feature of the fitness machine handle, with the first end of the hook-and-loop strap detachably fastened to the second end of the hook-and-loop strap by engagement of the plurality of loops with the plurality of hooks so as to secure the housing to the fitness machine handle.

5. The wireless remote control of claim 1, wherein the securing means of the housing comprises:
   a first hook-and-loop strap having first and second ends and first and second sides, the first end being affixed to the housing and the second end having a plurality of hooks on at least one of said first and second sides;
   a second hook-and-loop strap having first and second ends and first and second sides, the first end being affixed to the housing and the second end having a plurality of loops on at least one of said first and second sides,
   wherein the first and second hook-and-loop straps are disposed on opposite sides of a feature of the fitness machine handle so as to wrap around the feature of the fitness machine handle when the second end of the first hook-and-loop strap is detachably fastened to the second end of the second hook-and-loop strap by engagement of the plurality of loops with the plurality of hooks, thereby securing the housing to the fitness machine handle.

6. The wireless remote control of claim 1, wherein the securing means of the housing comprises at least one mechanical fastener.

7. The wireless remote control of claim 6, wherein the securing means of the housing further comprises at least one bracket, wherein the at least one bracket engages at least one feature of the fitness machine handle and the at least one mechanical fastener attaches the at least one bracket to the housing so as to secure the housing to the fitness machine handle.

8. The wireless remote control of claim 1, wherein the securing means of the housing comprises at least one ring clamp, the at least one ring clamp comprising:
   an opening substantially conforming to the cross-sectional profile of the fitness machine handle at a designated mount location on the fitness machine handle;
   a tightening element to adjust the size of the opening,
   wherein the at least one ring clamp is disposed around the fitness machine handle at the designated mount location on the fitness machine handle and the tightening element is tightened so as to rotationally and translationally secure the at least one ring clamp to the fitness machine handle.

9. The wireless remote control of claim 1, where in the securing means of the housing comprises at least one compliant snap-fit member, the at least one compliant snap-fit member forming a snap-fit relationship with at least one feature of the fitness machine handle.

10. The wireless remote control of claim 1, wherein the fitness machine is a rowing machine ergometer.

11. A wireless remote control comprising:
   a housing configured to function as a fitness machine handle;
   at least one user interface element disposed on the housing;
   a wireless communications module adapted to wirelessly exchange digital data with a media processing device;
   a processor electronically connected with the at least one user interface element and the wireless communications module, the processor being adapted to:
      receive input from the at least one user interface element, and in response to the input received from the at least one user interface element,
      transmit at least one media processing device control message to the media processing device by means of the wireless communications module;
   wherein the at least one user interface element is positioned on the housing so as to enable a user gripping the fitness machine handle to manipulate the at least one user interface element without substantially impairing the user's grip on the handle;
   power control electronics for controlling the operating state of the remote control, the power control electronics being electronically connected with the processor, and the operating state having at least a minimum-power mode and a full-function mode,
   an accelerometer for detecting motion, the accelerometer being electronically connected with the processor;
   wherein the processor is further adapted to:
      receive motion detection data from the accelerometer; and
      set the operating state of the remote control based on the motion detection data by means of the power control electronics;
   wherein the processor sets the operating state in the full-function mode when the motion detected by the accelerometer is at or above a minimum threshold for operation, and the processor sets the operating state in the minimum-power mode when the motion detected by the accelerometer remains below the minimum threshold for operation for a predetermined period of time; and
   at least one accelerometer for measuring acceleration in at least one direction, the at least one accelerometer being electronically connected with the processor, wherein the processor is further adapted to:
   receive acceleration measurements from the at least one accelerometer;
   calculate data representing characteristics of motion based on the acceleration measurements; and
   transmit the data representing characteristics of motion to the media processing device by means of the wireless communications module.

12. The wireless remote control of claim 11, wherein the wireless communications module is one of a Bluetooth transceiver, a WiFi transceiver, and an infrared optical transmitter.

13. The wireless remote control of claim 11, wherein the at least one user interface element is one of a physical button, a physical switch, a touch-sensitive switch, a potentiometer, an electronic rotary control, an electronic slider, and a graphical user interface control on a touchscreen display.

14. The wireless remote control of claim 11, wherein the fitness machine is a rowing machine ergometer.

* * * * *